US012691026B2

(12) United States Patent
Tan et al.

(10) Patent No.: US 12,691,026 B2
(45) Date of Patent: Jul. 28, 2026

(54) CONVENIENTLY STORED WALKING AID

(71) Applicant: Xinzhiyuan Medical Equipment (Guangdong) Co., Ltd., Foshan (CN)

(72) Inventors: Yunbin Tan, Foshan (CN); Zhongliang Liu, Foshan (CN); Xinsheng Xu, Foshan (CN); Tianxi Wang, Foshan (CN)

(*) Notice: Subject to any disclaimer, the term of this patent is extended or adjusted under 35 U.S.C. 154(b) by 220 days.

(21) Appl. No.: 18/760,480

(22) Filed: Jul. 1, 2024

(65) Prior Publication Data

US 2025/0134750 A1 May 1, 2025

(30) Foreign Application Priority Data

Oct. 25, 2023 (CN) ......................... 202322860431.2

(51) Int. Cl.
*A61H 3/04* (2006.01)
*A61H 3/00* (2006.01)

(52) U.S. Cl.
CPC ......... *A61H 3/04* (2013.01); *A61H 2003/002* (2013.01); *A61H 2003/005* (2013.01); *A61H 2201/0161* (2013.01)

(58) Field of Classification Search
CPC .............. A61H 3/04; A61H 2201/0161; A61H 2003/005
See application file for complete search history.

(56) References Cited

U.S. PATENT DOCUMENTS

| | | | | |
|---|---|---|---|---|
| 6,149,170 A * | 11/2000 | Dotson | B62K 3/16 280/282 |
| 6,808,188 B1 * | 10/2004 | Fan | B62K 5/00 280/263 |
| 6,848,696 B2 * | 2/2005 | Miller | A61H 3/04 482/68 |
| 7,780,180 B2 * | 8/2010 | Hoepner | A61H 3/04 280/263 |
| 8,348,288 B1 * | 1/2013 | Laughon, Sr. | A61H 3/04 280/87.021 |
| 8,523,211 B2 * | 9/2013 | Mailahn | A61H 3/04 280/263 |
| 8,608,184 B2 * | 12/2013 | Janis | A61H 3/04 280/87.021 |
| 8,827,284 B2 * | 9/2014 | Walther | B62K 5/023 280/87.041 |
| 10,617,591 B1 * | 4/2020 | Neville | B62K 5/003 |

(Continued)

*Primary Examiner* — Noah Chandler Hawk

(57) ABSTRACT

A conveniently stored walking aid, the walking aid includes a support frame, handlebars, wheels, and a U-shaped support pad, the support frame includes a height-adjustable T-shaped handle connector, a steering mechanism, a rotatable and foldable frame, a seat frame, and an arc-shaped connecting rod; the handlebars include a first handlebar and a second handlebar, the T-shaped handle connector includes a T-shaped connecting rod and a supporting rod, the first handlebar and the second handlebar are respectively arranged at two ends of the T-shaped connecting rod, several linearly arranged first fixed holes are provided on the T-shaped connecting rod, a top of the supporting rod is provided with a second fixed hole that matches the first fixed holes, the T-shaped connecting rod and the supporting rod are fixed by a first fixing pin; the steering mechanism comprises a T-shaped sleeve and a U-shaped steering shaft.

8 Claims, 6 Drawing Sheets

(56) References Cited

U.S. PATENT DOCUMENTS

| | | | | |
|---|---|---|---|---|
| 2004/0217565 | A1* | 11/2004 | Ramm | B62K 3/002 280/87.01 |
| 2006/0033297 | A1* | 2/2006 | Miller | B62K 3/002 280/87.021 |
| 2008/0284125 | A1* | 11/2008 | Ramm | B62K 3/002 280/263 |
| 2020/0390638 | A1* | 12/2020 | Jernigan, IV | B62K 25/02 |
| 2021/0259907 | A1* | 8/2021 | Vollmar | A61H 3/04 |

* cited by examiner

CONVENIENTLY STORED WALKING AID

1. TECHNICAL FIELD

The invention relates to the technical field of walking assistance devices for people with mobility impairments, in particular to a conveniently stored walking aid.

2. BACKGROUND ART

Congenital conditions, degenerative changes, and accidental injuries can lead to physical weakness, sometimes resulting in a loss of the ability to walk without assistance. Various mobility aids such as self-propelled vehicles, scooters, and walking aids have been designed to assist individuals with physical disabilities in walking.

Existing devices used to assist people with mobility impairments in walking can achieve the function of assisting walking, but due to the inability to fold, they are inconvenient to store; additionally, the height of the existing devices cannot be adjusted according to the user's needs.

Therefore, developing a conveniently stored walking aid has become an urgent problem for people to solve.

3. SUMMARY OF THE INVENTION

The technical problem addressed by the invention is that existing devices used to assist people with mobility impairments in walking can achieve the function of assisting walking, but due to the inability to fold, they are inconvenient to store; additionally, the height of the existing devices cannot be adjusted according to the user's needs.

To solve the above technical problems, the invention provides the following technical scheme: a conveniently stored walking aid, the walking aid comprises a support frame, handlebars, wheels, and a U-shaped support pad, the support frame comprises a height-adjustable T-shaped handle connector, a steering mechanism, a rotatable and foldable frame, a seat frame, and an arc-shaped connecting rod;

the handlebars comprise a first handlebar and a second handlebar, the T-shaped handle connector comprises a T-shaped connecting rod and a supporting rod, the first handlebar and the second handlebar are respectively arranged at two ends of the T-shaped connecting rod, several linearly arranged first fixed holes are provided on the T-shaped connecting rod, a top of the supporting rod is provided with a second fixed hole that matches the first fixed holes, the T-shaped connecting rod and the supporting rod are fixed by a first fixing pin;

the steering mechanism comprises a T-shaped sleeve and a U-shaped steering shaft, the U-shaped steering shaft is provided with a connecting tube, the U-shaped steering shaft is connected to the T-shaped sleeve through the connecting tube, the connecting tube passes through the T-shaped sleeve and is detachably connected to a bottom of the supporting rod, other end of the T-shaped sleeve is rotatably and foldably connected to the frame, one end of the frame away from the T-shaped sleeve is provided with a first fixing cylinder, the seat frame is provided with a plurality of third fixed holes arranged in a linear manner, the first fixing cylinder is provided with a fourth fixed hole that matches the third fixing holes, one end of the seat frame is detachably connected to the U-shaped support pad, and the other end is fixed to the first fixing cylinder by a second fixing pin; the arc-shaped connecting rod is arranged below the frame, the arc-shaped connecting rod is rotatably and foldably connected to the frame;

the wheels comprise front wheels and rear wheels, the front wheels are detachably connected to the U-shaped steering shaft, and the rear wheels are detachably connected to the arc-shaped connecting rod.

Further, the front wheels comprise a first front wheel and a second front wheel, the first front wheel is arranged on a left outer side of the U-shaped steering shaft, and the second front wheel is arranged on a right outer side of the U-shaped steering shaft;

the rear wheels comprise a first rear wheel and a second rear wheel, the first rear wheel is arranged on a left side of the arc-shaped connecting rod, and the second rear wheel is arranged on a right side of the arc-shaped connecting rod.

Further, one end of the arc-shaped connecting rod is provided with a second fixing cylinder, the other end is provided with a connecting shaft, the second fixing cylinder is sleeved onto an outer surface of the first fixing cylinder, an L-shaped connector is arranged on the first fixing cylinder, a bottom of the first fixing cylinder is fixed in the second fixing cylinder through a fixing member, a top of the second fixing cylinder is fixedly connected to the L-shaped connector through a third fixing pin;

the first rear wheel and the second rear wheel are respectively fixed to two sides of the arc-shaped connecting rod through the connecting shaft.

Further, a connecting plate is arranged on a top of the seat frame, the connecting plate is fixed to the top of the seat frame, the seat frame is detachably connected to the U-shaped support pad through the connecting plate.

Further, the T-shaped sleeve is fixed to the frame through a folding fixing buckle, and a top of the connecting tube is connected to the bottom of the supporting rod through the folding fixing buckle.

Further, the folding fixing buckle comprises two hinged folding plates, and a locking buckle is arranged between the two folding plates away from a hinged end.

Further, the handlebars are made of rubber.

Further, a front side of the support frame is provided with a detachable basket bag.

Compared with the prior art, the invention has the following advantages: the invention adopts a coordinated structure of the support frame, handlebars, wheels, and U-shaped support pad; since the T-shaped handle connector is detachably connected to the steering mechanism, the steering mechanism is detachably connected to the frame, the arc-shaped connecting rod is detachably connected to the frame, and the T-shaped handle connector is connected to the steering mechanism through the sleeve, the T-shaped handle connector and the steering mechanism can be folded; the steering mechanism and the frame can be folded; therefore, the invention is easy to store and occupies less space; as the height of the T-shaped handle connector and the seat frame can be adjusted, the invention is suitable for users of different heights, making the invention have a wider range of applications. The invention is easy to operate and has a reasonable design, and is worthy of promotion.

4. BRIEF DESCRIPTION OF ACCOMPANY DRAWINGS

Figure 1:
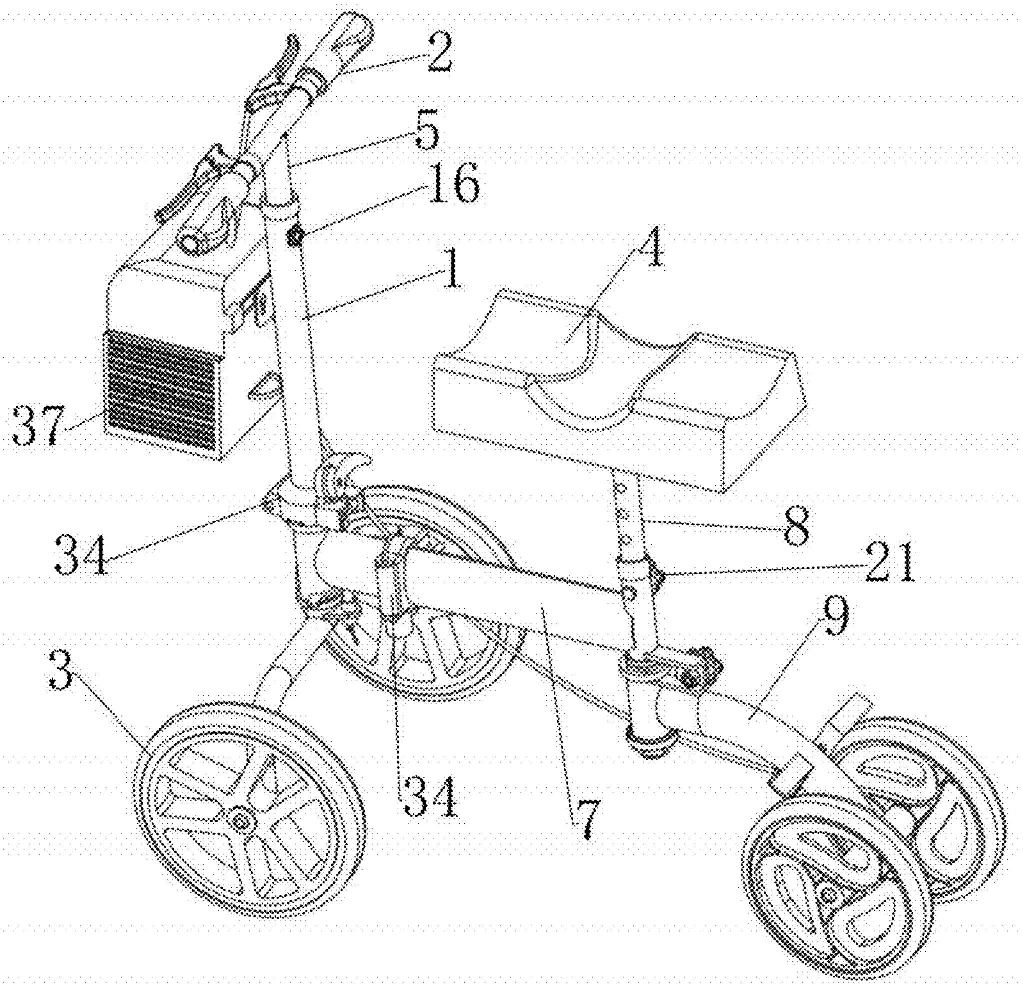
FIG. 1 is a schematic diagram 1 of the structure of the conveniently stored walking aid of the invention.
Figure 2:
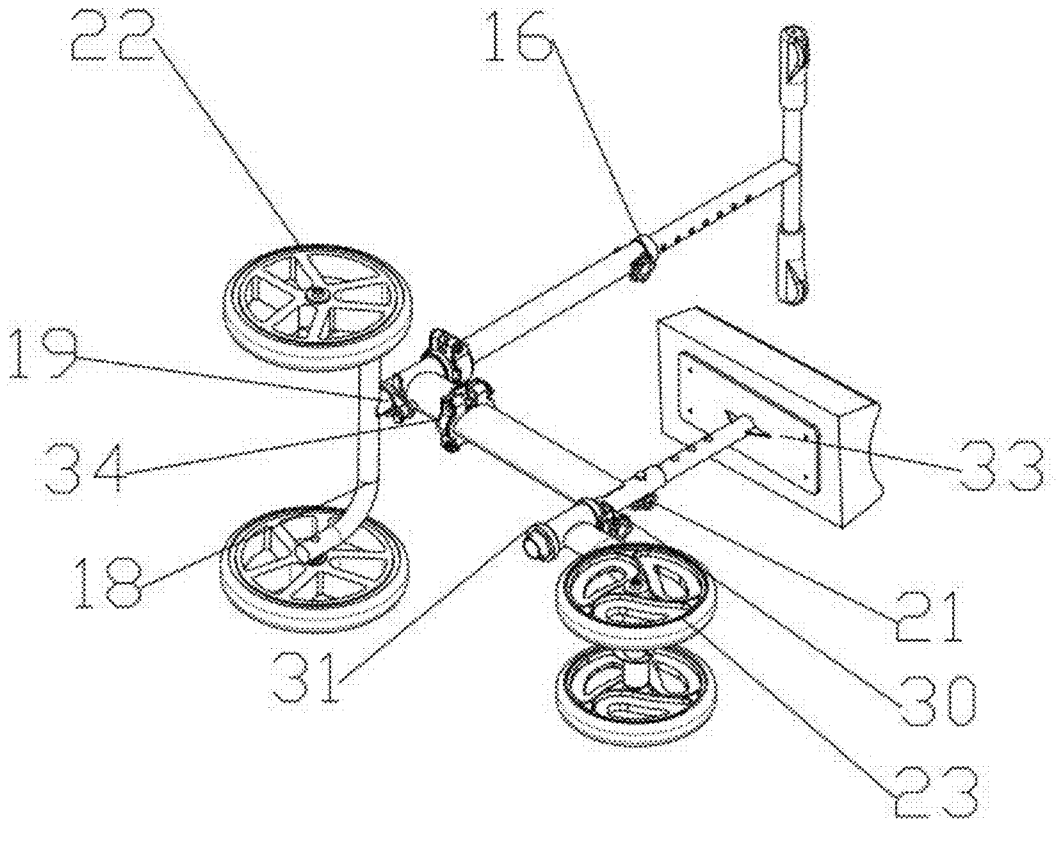
FIG. 2 is a schematic diagram 2 of the structure of the conveniently stored walking aid.
Figure 3:
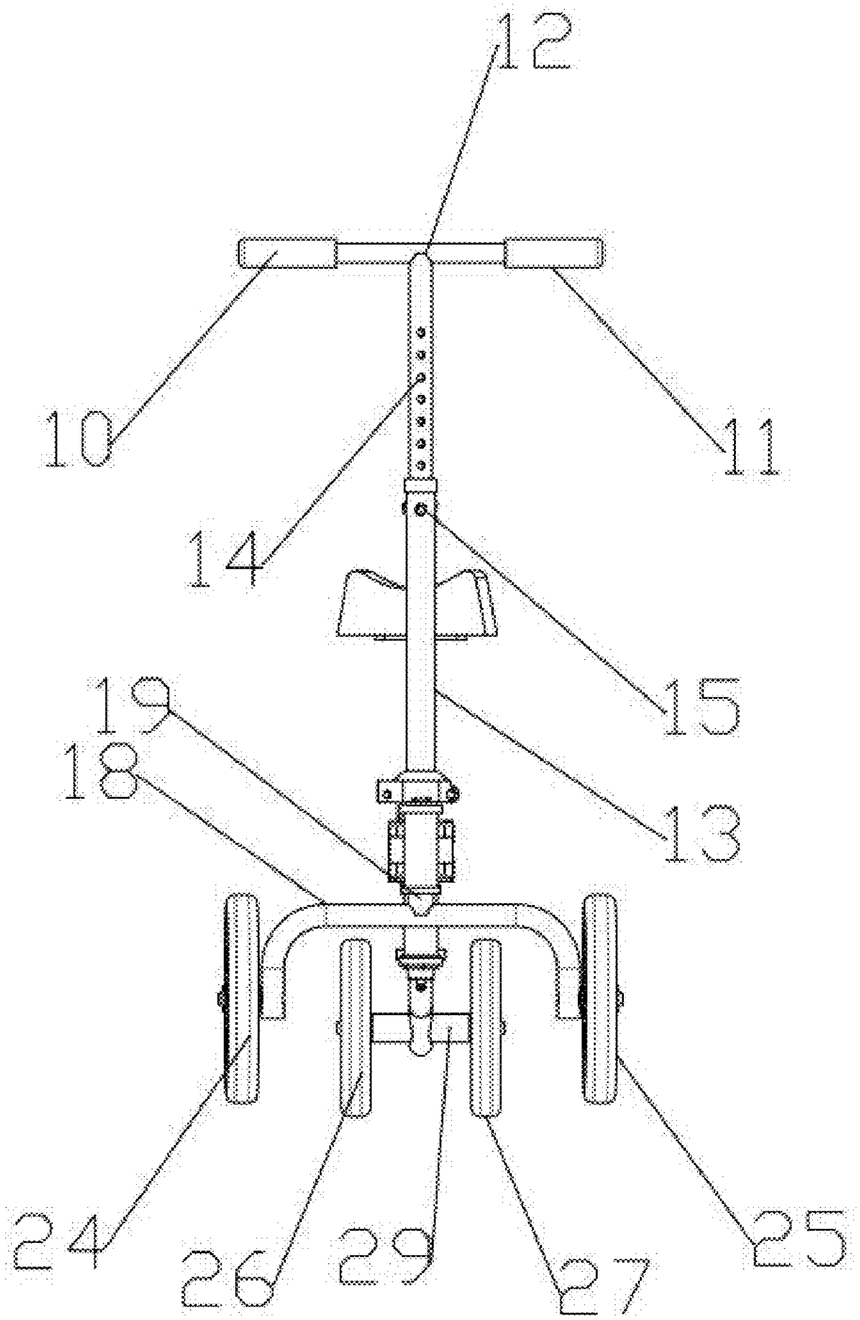
FIG. 3 is a front view of the front end of the conveniently stored walking aid of the invention.
Figure 4:
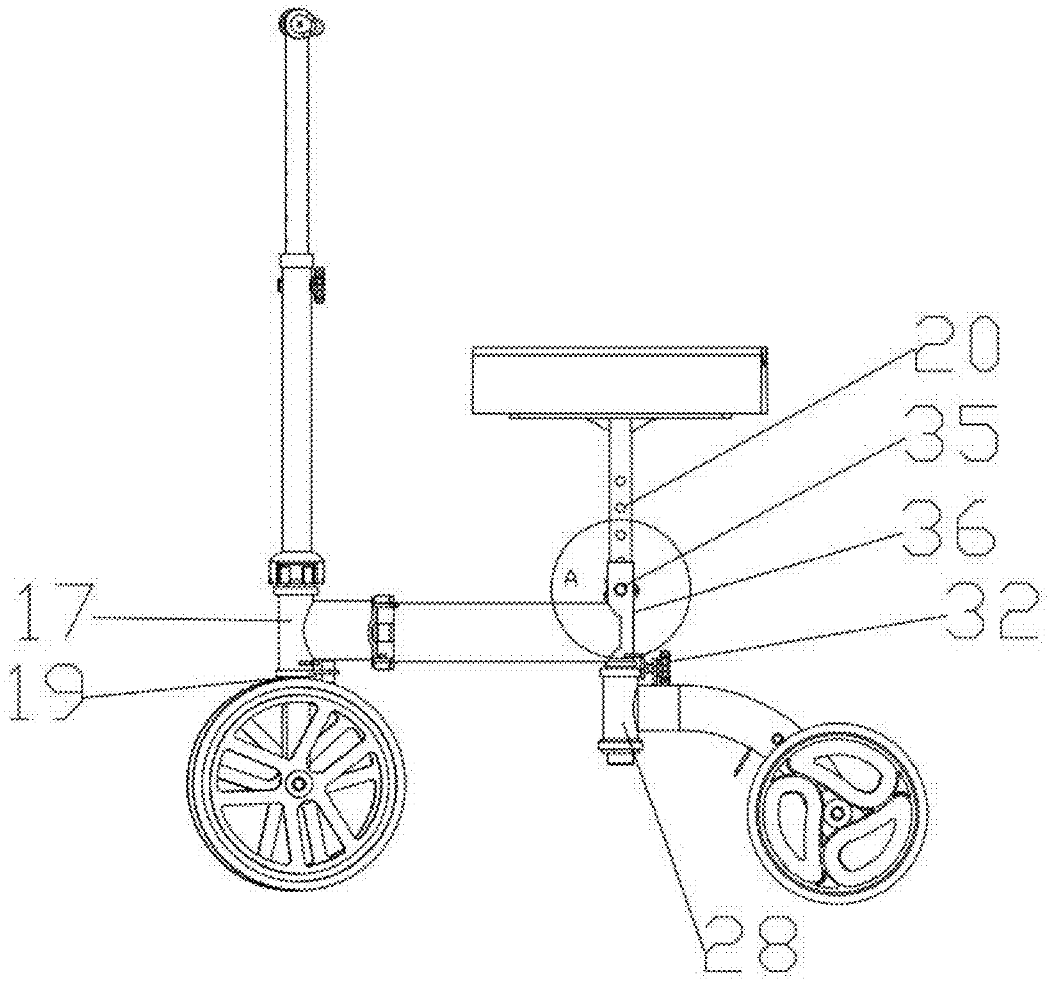
FIG. 4 is a side view of the conveniently stored walking aid of the invention.
Figure 5:
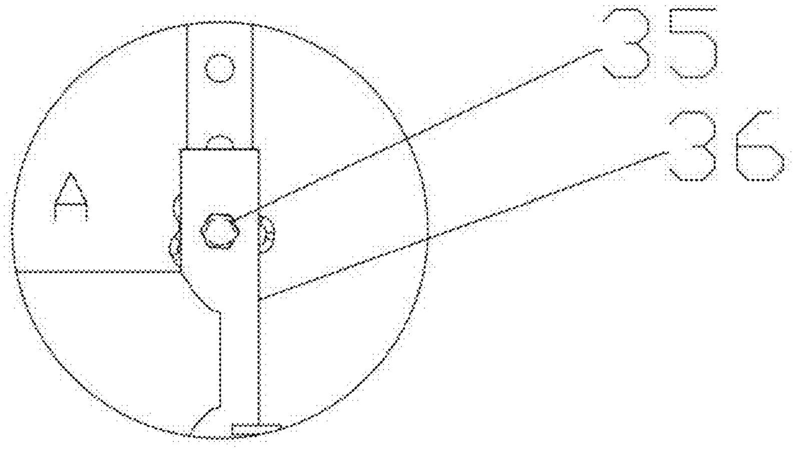
FIG. 5 is a partial enlarged view of point A in FIG. 4.
Figure 6:
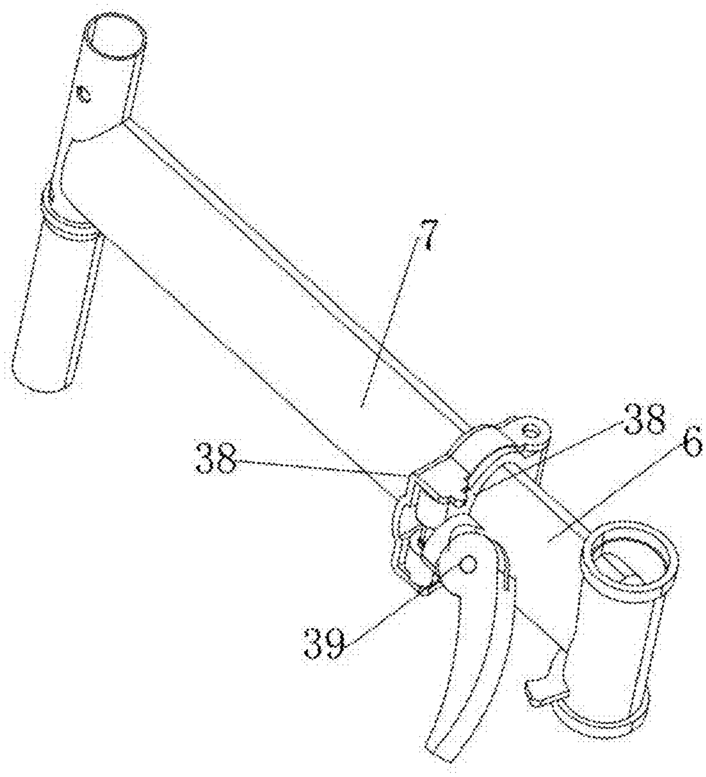
FIG. 6 is a schematic diagram of the structure of the folding fixing buckle of the conveniently stored walking aid of the invention.

As shown in the figures: 1 support frame, 2 handlebar, 3 wheel, 4 U-shaped support pad, 5 T-shaped handle connector, 6 steering mechanism, 7 frame, 8 seat frame, 9 arc-shaped connecting rod, 10 first handlebar, 11 second handlebar, 12 T-shaped connecting rod, 13 supporting rod, 14 first fixed hole, 15 second fixed hole, 16 first fixing pin, 17 T-shaped sleeve, 18 U-shaped steering shaft, 19 connecting tube, 20 third fixed hole, 21 second fixing pin, 22 front wheel, 23 rear wheel, 24 first front wheel, 25 second front wheel, 26 first rear wheel, 27 second rear wheel, 28 second fixing cylinder, 29 connecting shaft, 30 L-shaped connector, 31 fixing member, 32 third fixing pin, 33 connecting plate, 34 folding fixing buckle, 35 fourth fixed hole, 36 first fixing cylinder, 37 basket bag, 38 folding plate, 39 locking buckle.

5. SPECIFIC EMBODIMENT OF THE INVENTION

The conveniently stored walking aid of the invention is further described in detail below with reference to the accompanying drawings.

Combined with FIG. 1-5, the invention is described below in details.

To solve the above technical problems, the invention provides the following technical scheme: the conveniently stored walking aid, the walking aid comprises a support frame 1, handlebars 2, wheels 3, and a U-shaped support pad 4, the support frame 1 comprises a height-adjustable T-shaped handle connector 5, a steering mechanism 6, a rotatable and foldable frame 7, a seat frame 8, and an arc-shaped connecting rod 9;

- the handlebars 2 comprise a first handlebar 10 and a second handlebar 11, the T-shaped handle connector 5 comprises a T-shaped connecting rod 12 and a supporting rod 13, the first handlebar 10 and the second handlebar 11 are respectively arranged at two ends of the T-shaped connecting rod 12, several linearly arranged first fixed holes 14 are provided on the T-shaped connecting rod 12, a top of the supporting rod 13 is provided with a second fixed hole 15 that matches the first fixed holes 14, the T-shaped connecting rod 12 and the supporting rod 13 are fixed by a first fixing pin 16;
- the steering mechanism 6 comprises a T-shaped sleeve 17 and a U-shaped steering shaft 18, the U-shaped steering shaft 18 is provided with a connecting tube 19, the U-shaped steering shaft 18 is connected to the T-shaped sleeve 17 through the connecting tube 19, the connecting tube 19 passes through the T-shaped sleeve 17 and is detachably connected to a bottom of the supporting rod 13, other end of the T-shaped sleeve 17 is rotatably and foldably connected to the frame 7, one end of the frame 7 away from the T-shaped sleeve 17 is provided with a first fixing cylinder 36, the seat frame 8 is provided with a plurality of third fixed holes 20 arranged in a linear manner, the first fixing cylinder 36 is provided with a fourth fixed hole 35 that matches the third fixing holes 20, one end of the seat frame 8 is detachably connected to the U-shaped support pad 4, and the other end is fixed to the first fixing cylinder 36 by a second fixing pin 21; the arc-shaped connecting rod 9 is arranged below the frame 7, the arc-shaped connecting rod 9 is rotatably and foldably connected to the frame 7;
- the wheels 3 comprise front wheels 22 and rear wheels 23, the front wheels 22 are detachably connected to the U-shaped steering shaft 18, and the rear wheels 23 are detachably connected to the arc-shaped connecting rod 9.
- the front wheels 22 comprise a first front wheel 24 and a second front wheel 25, the first front wheel 24 is arranged on a left outer side of the U-shaped steering shaft 18, and the second front wheel 25 is arranged on a right outer side of the U-shaped steering shaft 18;
- the rear wheels 23 comprise a first rear wheel 26 and a second rear wheel 27, the first rear wheel 26 is arranged on a left side of the arc-shaped connecting rod 9, and the second rear wheel 27 is arranged on a right side of the arc-shaped connecting rod 9.
- one end of the arc-shaped connecting rod 9 is provided with a second fixing cylinder 28, the other end is provided with a connecting shaft 29, the second fixing cylinder 28 is sleeved onto an outer surface of the first fixing cylinder 36, an L-shaped connector 30 is arranged on the first fixing cylinder 36, a bottom of the first fixing cylinder 36 is fixed in the second fixing cylinder 28 through a fixing member 31, a top of the second fixing cylinder 28 is fixedly connected to the L-shaped connector 30 through a third fixing pin 32;
- the first rear wheel 26 and the second rear wheel 27 are respectively fixed to two sides of the arc-shaped connecting rod 9 through the connecting shaft 29;
- a connecting plate 33 is arranged on a top of the seat frame 8, the connecting plate 33 is fixed to the top of the seat frame 8, the seat frame 8 is detachably connected to the U-shaped support pad 4 through the connecting plate 33.

The T-shaped sleeve 17 is fixed to the frame 7 through a folding fixing buckle 34, and a top of the connecting tube 19 is connected to the bottom of the supporting rod 13 through the folding fixing buckle 34.

The handlebars 2 are made of rubber.

A front side of the support frame 1 is provided with a detachable basket bag 37.

Figure 7:
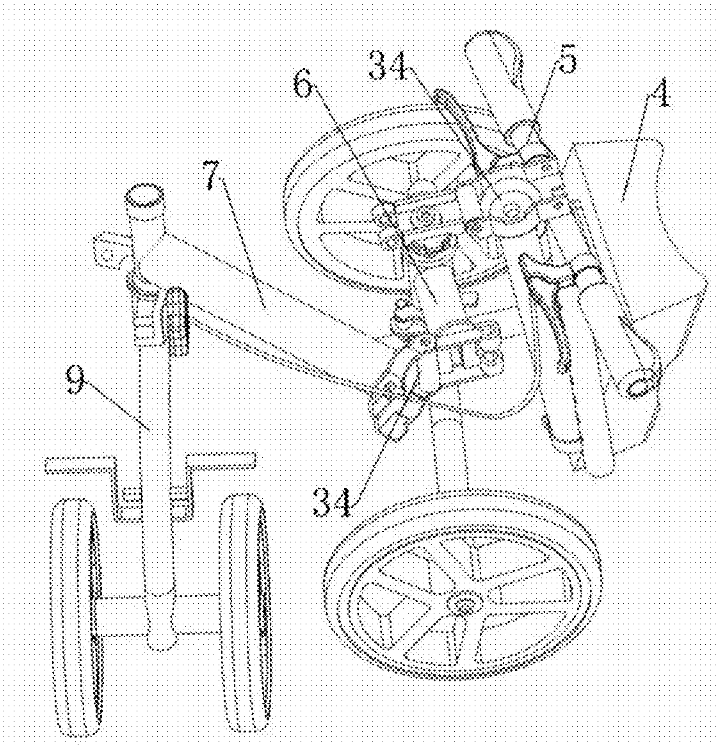
FIG. 7 is a schematic diagram of the semi-folded storage state of the conveniently stored walking aid of the invention.
Figure 8:
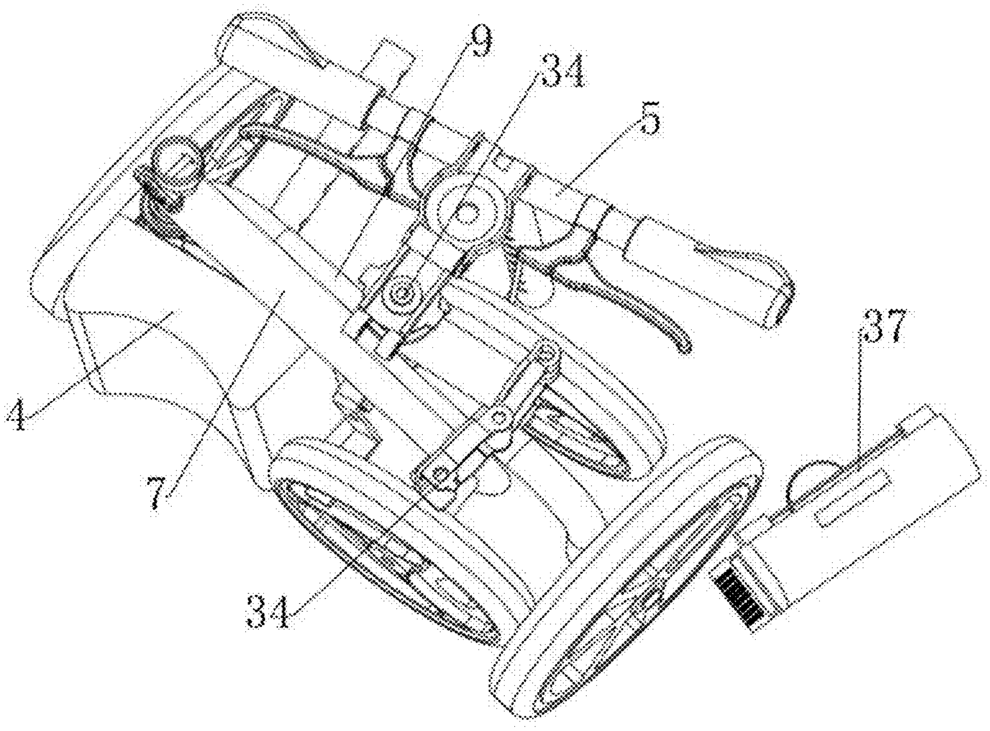
FIG. 8 is a schematic diagram of the fully folded storage state of the conveniently stored walking aid of the invention.

The specific implementation process of the conveniently stored walking aid of the invention is as follow: firstly, adjusting the height of the T-shaped handle connector 5 and the seat frame 8 according to the user's height, so that the first fixed hole 14 aligns with the second fixed hole 15, and fixing them with the first fixing pin 16; then aligning the third fixed hole 20 with the fourth fixed hole 35, and fixing them with the second fixing pin 21;

When not in use, i.e., during storage, as shown in FIGS. 7 and 8, the main steps are as follows:

- step 1: first disassembling the basket bag 37 and compressing it, and removing the U-shaped support pad 4, unscrewing the second fixing pin 21 to make the seat frame 8 fall to the lowest position;
- step 2: loosening the third fixing pin 32, allowing the first fixing cylinder 36 to rotate within the second fixing cylinder 28 until it aligns parallel to the frame 7, that is, rotating the arc-shaped connecting rod 9 and wheels 3 located at the rear to a bottom of the frame 7, opening the folding fixing buckle 34 between the frame 7 and the steering mechanism 6, enabling the T-shaped sleeve 17 of the steering mechanism 6 to rotate and fold with the frame 7, so that the axis of the front two wheels 3 tend to be perpendicular to the axis of the rear two wheels 3;

step 3: unscrewing the first fixing pin 16 to lower the T-shaped connecting rod 12 to its lowest position and locking it, or detaching the T-shaped connecting rod 12 from the supporting rod 13, opening the folding fixing buckle 34 between the connecting tube 19 and the supporting rod 13, allowing the supporting rod 13 to flip downwards for folding;

step 4: placing the basket bag 37 and the U-shaped support pad 4 removed in step 1 in the gap of the folded frame so that the basket bag 37 and the U-shaped support pad 4 do not occupy extra space when packed and stored.

The invention adopts a coordinated structure of the support frame 1, handlebars 2, wheels 3, and U-shaped support pad 4; since the T-shaped handle connector 5 is detachably connected to the steering mechanism 6, the steering mechanism 6 is detachably connected to the frame 7, the arc-shaped connecting rod 9 is detachably connected to the frame 7, and the T-shaped handle connector 5 is connected to the steering mechanism 6 through the sleeve, the T-shaped handle connector 5 and the steering mechanism 6 can be folded; the steering mechanism 6 and the frame 7 can be folded; therefore, the invention is easy to store and occupies less space; as the height of the T-shaped handle connector 5 and the seat frame 8 can be adjusted, the invention is suitable for users of different heights, making the invention have a wider range of applications. The invention is easy to operate and has a reasonable design, and is worthy of promotion.

The invention and its embodiments are described above, this description is not restrictive, and what is shown in the accompanying drawing is only one of the embodiments of the invention, and the actual structure is not limited to this. All in all, if those skilled in the art receives its enlightenment, without deviating from the object of the invention, and without creatively designing structures and embodiments similar to the technical scheme of the invention shall fall within the protection scope of the invention.

The invention claimed is:

1. A conveniently stored walking aid, wherein the walking aid comprises a support frame, handlebars, wheels, and a U-shaped support pad, the support frame comprises a height-adjustable T-shaped handle connector, a steering mechanism, a rotatable and foldable frame, a seat frame, and an arc-shaped connecting rod;

the handlebars comprise a first handlebar and a second handlebar, the T-shaped handle connector comprises a T-shaped connecting rod and a supporting rod, the first handlebar and the second handlebar are respectively arranged at two ends of the T-shaped connecting rod, several linearly arranged first fixed holes are provided on the T-shaped connecting rod, a top of the supporting rod is provided with a second fixed hole that matches the first fixed holes, the T-shaped connecting rod and the supporting rod are fixed by a first fixing pin;

the steering mechanism comprises a T-shaped sleeve and a U-shaped steering shaft, the U-shaped steering shaft is provided with a connecting tube, the U-shaped steering shaft is connected to the T-shaped sleeve through the connecting tube, the connecting tube passes through the T-shaped sleeve and is detachably connected to a bottom of the supporting rod, other end of the T-shaped sleeve is rotatably and foldably connected to the frame, one end of the frame away from the T-shaped sleeve is provided with a first fixing cylinder, the seat frame is provided with a plurality of third fixed holes arranged in a linear manner, the first fixing cylinder is provided with a fourth fixed hole that matches the third fixing holes, one end of the seat frame is detachably connected to the U-shaped support pad, and the other end is fixed to the first fixing cylinder by a second fixing pin; the arc-shaped connecting rod is arranged below the frame, the arc-shaped connecting rod is rotatably and foldably connected to the frame;

the wheels comprise front wheels and rear wheels, the front wheels are detachably connected to the U-shaped steering shaft, and the rear wheels are detachably connected to the arc-shaped connecting rod.

2. The conveniently stored walking aid of claim 1, the front wheels comprise a first front wheel and a second front wheel, the first front wheel is arranged on a left outer side of the U-shaped steering shaft, and the second front wheel is arranged on a right outer side of the U-shaped steering shaft;

the rear wheels comprise a first rear wheel and a second rear wheel, the first rear wheel is arranged on a left side of the arc-shaped connecting rod, and the second rear wheel is arranged on a right side of the arc-shaped connecting rod.

3. The conveniently stored walking aid of claim 2, wherein one end of the arc-shaped connecting rod is provided with a second fixing cylinder, the other end is provided with a connecting shaft, the second fixing cylinder is sleeved onto an outer surface of the first fixing cylinder, an L-shaped connector is arranged on the first fixing cylinder, a bottom of the first fixing cylinder is fixed in the second fixing cylinder through a fixing member, a top of the second fixing cylinder is fixedly connected to the L-shaped connector through a third fixing pin;

the first rear wheel and the second rear wheel are respectively fixed to two sides of the arc-shaped connecting rod through the connecting shaft.

4. The conveniently stored walking aid of claim 1, wherein a connecting plate is arranged on a top of the seat frame, the connecting plate is fixed to the top of the seat frame, the seat frame is detachably connected to the U-shaped support pad through the connecting plate.

5. The conveniently stored walking aid of claim 1, wherein the T-shaped sleeve is fixed to the frame through a folding fixing buckle, and a top of the connecting tube is connected to the bottom of the supporting rod through the folding fixing buckle.

6. The conveniently stored walking aid of claim 1, wherein the folding fixing buckle comprises two hinged folding plates, and a locking buckle is arranged between the two folding plates away from a hinged end.

7. The conveniently stored walking aid of claim 1, wherein the handlebars are made of rubber.

8. The conveniently stored walking aid of claim 1, wherein a front side of the support frame is provided with a detachable basket bag.

* * * * *